(12) United States Patent
Plösch et al.

(10) Patent No.: US 8,005,783 B2
(45) Date of Patent: Aug. 23, 2011

(54) METHOD AND SYSTEM FOR OPTIMIZING REUSE OF ARTIFACTS BASED ON ASSESSMENT AND CLASSIFICATION

(75) Inventors: Reinhold Plösch, Linz (AT); Simone Prummer, Neunkirchen am Brand (DE); Herbert Prähofer, Linz (AT); Fritz Stallinger, Linz (AT); Jan Vollmar, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 823 days.

(21) Appl. No.: 12/038,236

(22) Filed: Feb. 27, 2008

(65) Prior Publication Data
US 2009/0216346 A1    Aug. 27, 2009

(51) Int. Cl.
    *G06F 15/00*      (2006.01)
    *G06F 15/18*      (2006.01)
    *G06F 9/44*       (2006.01)
(52) U.S. Cl. .......................................... 706/62; 717/120
(58) Field of Classification Search ........................ None
See application file for complete search history.

(56) References Cited

U.S. PATENT DOCUMENTS
2005/0120333 A1*   6/2005   Inoue et al. ................... 717/120
2008/0222179 A1*   9/2008   Greene et al. ................ 707/101

OTHER PUBLICATIONS

Yao, et al.; "Towards a Semantic-based Approach for Software Reusable Component Classification and Retrieval"; 2004; ACM-SE 42: Proceedings of the 42nd annual Southeast region conference; pp. 110-115.*
Washizaki, Hironori, et al.; "A Metrics Suite for Measuring Reusability of Software Components"; 2003; Proceedings of the 9th International Symposium on Software Metrics (2003); pp. 1-13.*
Etzkorn, L. H., et al.; "Automated reusability quality analysis of OO legacy software"; Apr. 2001; Information and Software Technology, vol. 43, Issue 5; pp. 295-308.*
Prieto-Diaz, R et al.; "Classifying software for reusability"; 1987; IEEE Software vol. 4, No. 1; pp. 6-16.*
Stallinger, Fritz et al.; "A Process Reference Model for Reuse in Industrial Engineering: Enhancing the ISO/IEC 15504 Framework to Cope with Organizational Reuse Maturity"; 2006; Proceedings of the SPICE 2006 conference, Luxembourg, May 4-5, 2006; 8 pages.*

* cited by examiner

*Primary Examiner* — Jeffrey A Gaffin
*Assistant Examiner* — Stanley K Hill

(57) ABSTRACT

The present invention refers to a method and system for automatizing optimization of reuse of artifacts in industrial engineering, wherein the reuse of artifacts is optimized by assessing of artifacts based on classifying of artifacts by assessing of a top-down artifact and assessing of a bottom-up artifact. Assessing of a bottom-up artifact includes classifying of the bottom-up artifact based on a classification scheme for bottom-up artifacts using two dimensions for classification.

12 Claims, 7 Drawing Sheets

METHOD AND SYSTEM FOR OPTIMIZING REUSE OF ARTIFACTS BASED ON ASSESSMENT AND CLASSIFICATION

BACKGROUND OF THE INVENTION

The present invention refers to a method for optimizing reuse of artifacts in industrial engineering and to computing entities and system supporting the optimization of reuse of artifacts in industrial engineering as enabled by the method.

In particular, the present invention refers to a systematic improvement of reuse of entities in industrial engineering, wherein the industrial engineering refers to at least one of following, the development of products and the development of solutions.

When considering, for example, developments of industrial products or solutions like industrial constructions, structural works, equipments, or structures, detection of reusable entities or components of these industrial products becomes a more and more important issue. Such industrial products or solutions like high velocity trains or power plants, for example, are constructed by a set of mechanical or physical entities or components, wherein a mechanical or physical entity can be composed by further mechanical or physical entities or components. The construction of an industrial product or solution is usually presented and provided by a set of documents comprising, for example, constructional drawings, schemes, structural plans, working designs, descriptions, analysis, experimental, or conditional sheets, or simply relevant notes. Further, also requirement descriptions or offers concerning the industrial product belong to documents specifying the industrial product. All of this data concerning the industrial product represent the product with regard to several abstraction levels of construction, structure, or character of the product. When developing new industrial products or searching for new solutions, knowledge of previous developments and/or previous solutions is very important. Usually, only experts of the respective development area possess this knowledge, wherein an expert typically has knowledge about only a small part of the previous development. Thus, the expert has some overview of some of documents characterizing some previous developments. Consequently, no complete overview of previous work is available when working at new industrial systems, products or solutions. Therefore, situations will occur often, in which some relevant information, development, or solution, which could be reused for a current work, will not be reused and time and efforts will be invested in an object, entity, or component being evolved previously.

A possibility of reuse of knowledge of previous engineering or development processes in a current engineering or development process where appropriate, in particular, recognition or reusable entities or components (referred to as artefacts in following) becomes more and more important, as both costs and complexity of engineering or development may be reduced and also the quality of new products or solutions can be improved considerably when reusing established entities or components of previous developments where appropriate.

In following, as already mentioned, information, knowledge or data about (mechanical or physical) entities or components of industrial products or solutions will be referred to as artefacts. These artefacts may be, for example, documents comprising constructional drawings, schemes, structural plans, working designs, descriptions, analysis, experimental, or conditional sheets, or simply relevant notes, requirement specification or offers/bid documents with regard to an industrial product or solution. Thus, artefacts represent data concerning the structure, construction, and/or characteristics of an industrial product or solution.

When implementing the desired reuse of entities or components, or artefacts, respectively, the following problems have to be overcome:

Several approaches to reuse exist. A systematic differentiation between these kinds of reuse is often difficult. Therefore, a structured and continuous tracking of one view, approach, or kind of reuse is hardly possible. However, despite the problem of the systematic differentiation of the different kinds of reuse, this differentiation imperative and necessary to ensure a maximal use of potential or the reuse of artifacts.

Further, in most cases the degree of structuring or level of the abstraction of the artefacts, which could be reused, is not available automatically but is known just to the experts. However, this information is important when implementing the desired reuse.

Additionally, a systematic differentiation between a top-down and bottom-up reuse approach is also a complex task.

The top-down reuse approach is performed by anew use of top-down artifacts. A top-down artifact is a semi-finished or intermediate product or solution, the open parts (entities or artifacts, respectively) of which may be added targeted to the semi-finished or intermediate product or solution to determine and provide the whole system of a product or solution. Here, a kind of scheme or structure of a semi-finished or intermediate product or of a solution is provided, in which some of parts are known or determined and some of parts are unknown or not determined. The task is to find or determine the missed parts.

For doing this, a top-down approach is used. According to the top-down approach, a system, product, or solution is developed by taking at least one already existing or provided semi-finished or intermediate product or solution and by targeted adding of parts (entities or artifacts, respectively) to the at least one already existing or provided semis finished or intermediate product or solution. The added parts (entities or components, or artifacts, respectively) supplement the semi-finished or intermediate product or solution in their original or in an adapted form. This process can be performed until the development or construction of the desired system, product, or solution is completed.

The addition of parts (entities or components, or artifacts, respectively) to the already existing or provided semi-finished or intermediate product or solution can be performed in several ways. An example of an easy implementation is the adding by use of a pool or set of entities or components, wherein at least one entity or component from the pool or set of entities or components fitting best or being generally suitable is detected and added to the already existing or provided semi-finished or intermediate product or solution. It is supposable, that at least at the end of the process of the construction of the desired system, product, or solution the parts to be added will be adapted or constructed (anew) such that they fit into the desired system, product, or solution and that they are suitable to complement the semi-finished or intermediate product or solution.

The bottom-up reuse approach is performed by anew use of bottom-up artifacts. A bottom-up artifact is a component, which is determined by use of or chosen from a pool or set of artifacts and which is connected with other artifacts to develop a desired system, product, or solution step by step. The composition or connection of bottom-up artifacts is performed stepwise or iterative. In particular, by composition or connection of (bottom-up) artifacts or components larger entities or artifacts are developed and derived. These larger entities or artifacts are then bottom-up artifacts to be connected or composed with other entities, or components, or artifacts in a next step or level of development of the desired system, product, or solution. The bottom-up development can be seen as a kind of bricks or parts, which can be assembled and connected in many ways to build a solution.

From a model view, a bottom-up artifact typically represents a general component. A component is therefore defined as a part of a whole (system, product, or solution). Components can be used to construct an industrial system, product, or solution. An entity is a more comprehensive or abstract object, which can be composed by several components.

Because of problems, pointed out above, the known reuse of artifacts is not automatized. An automatization is provided neither entirely nor partially. Usually, knowledge of experts is used when thinking of reusing entities of previous developments or solutions in current developments or solutions.

Further, no proposals of how to appraise artefacts with regard to both qualitative and quantitative aspects are available.

Thus, there is a need for revising deficits of reuse in engineering organizations and for support when deciding on a possible reuse of an artifact.

SUMMARY OF THE INVENTION

With the present invention, an automated detection of capability or potential for reuse and an automated revision of identified deficits for reuse are provided allowing for top-down and bottom-up reuse.

In particular, a method for optimizing reuse of artifacts in industrial engineering is provided, said method comprising systematic assessing of artifacts based on classifying of artifacts.

The systematic assessing comprises assessing of at least one top-down artifact. The assessing of the top-down artifact comprises classifying of the top-down artifact based on a classification scheme for top-down artifacts. According to an embodiment, the classification scheme for top-down artifacts can comprise two dimensions for classification of top-down artifacts.

Further, a first dimension of said two dimensions for classification of top-down artifacts can be modelled to classify the top-down artifact based on the character of preparation and the information content of said top-down artifact. A second dimension of said two dimensions for classification of top-down artifacts, in turn, can be modelled to classify said top-down artifact based on degree of structural information of said top-down artifact.

Additionally, the assessing of a top-down artifact can comprise determining of a degree of coverage of said top-down artifact. Further, the assessing of said top-down artifact can comprise estimation of a persistence of reuse of said top-down artifact.

In addition to assessing of top-down artifacts, said systematic assessing can comprise assessing of at least one bottom-up artifact, wherein said assessing of said bottom-up artifact can be implemented to be performed if said top-down artifact comprises said bottom-up artifact.

The assessing of a bottom-up artifact comprises classifying of the bottom-up artifact based on a classification scheme for bottom-up artifacts, wherein the classification scheme for bottom-up artifacts can be modelled to comprise two dimensions for classification of bottom-up artifacts. Here, the first dimension of said two dimensions for classification of bottom-up artifacts can be implemented to classify a bottom-up artifact according to a degree of availability of the bottom-up artifact. Further, the second dimension of the two dimensions for classification of bottom-up artifacts can be implemented to classify a bottom-up artifact according to a degree of parameterizability of the bottom-up artifact.

Additionally, the assessing of a bottom-up artifact can comprise also determining of a degree of coverage of the bottom-up artifact.

Furthermore, the present invention provides a computing entity for supporting optimization of reuse of artifacts in industrial engineering, wherein the entity is configured to perform optimizing of reuse of artifacts in industrial engineering by systematic assessing of artifacts based on classifying of artifacts as outlined above and as described in more detail bellow. This entity may be, for example, be a kind of an artifact assessor.

The present invention provides also a computing entity for supporting optimization of reuse of artifacts in industrial engineering, which is configured to visualize results of the optimizing of reuse of artifacts in industrial engineering by systematic assessing of artifacts based on classifying of artifacts as outlined above and as described in more detail below.

Further, by present invention also a system for supporting optimization of reuse of artifacts in industrial engineering is provided, wherein the system comprises the computing entity configured to perform optimizing of reuse of artifacts in industrial engineering by systematic assessing of artifacts based on classifying of artifacts. Additionally, the system can also comprise the computing entity configured to visualize results of the optimizing of reuse of artifacts in industrial engineering by systematic assessing of artifacts based on classifying of artifacts.

For essential artifacts, resulting from the process of development/engineering of a product or solution, the degree and/or the quality of the reuse are assessed or determined.

This assessment or determination can be performed in partially automatized way, as the data provided for the assessment can be provided manually. The classification of artifacts according to the extent or degree and/or according to the quality of the reuse can be provided with additional information. Starting with this classification of artifacts an automatized analysis of artifacts can be started to determine a more exact extent or degree and/or the quality of the reuse.

BRIEF DESCRIPTION OF THE FIGURES

The present invention will be more clearly understood from the following description of the preferred embodiments of the invention read in conjunction with the attached drawings, in which.

DETAILED DESCRIPTION OF THE FIGURES

As already mentioned above, the methodology of assessing artifacts can be used for both top-down and bottom-up artifacts.

The artifacts are assessed, wherein due to possible large number of artifacts it may be useful to perform the assessment with regard to a chosen set of artifacts and not to all available artifacts. The assessment process or step can be performed to more central or to more important artifacts, artifacts performing or having central or important function in a system, product, or solution. Here, several criteria can be applied when deciding on or determining the set of artifacts to be assessed. In following, such artifacts will be referred to as key artifacts. Due to the key role or function of key artifacts in a system, product, or solution the quality of such key artifacts determines or decides on the quality of the whole engineering or development process and, thus, on the quality of the desired system, product, or solution. As key artifacts can be seen, for example, customer needs or requirements with regard to desired systems, products, or solutions; offers with regard to desired systems, products, or solutions; system, product or solution requirements; basis or general architectures of systems, products, or solutions; detailed architectures of systems, products, or solutions; or test specifications. These artifacts should be seen as examples for key artifacts. Dependent on a certain development or engineering project also further artifacts may be chosen as key artifacts.

As already mentioned, both kinds of artifacts top-down and bottom-up artifacts may be used when assessing artifacts which could be reused. In general, the following steps can be performed: assessing top-down artifacts; assessing bottom-up artifacts; representing results of assessment of top-down artifacts; representing results of assessment of bottom-up artifacts; determination of capability or potential of assessed top-down and/or bottom-up artifacts.

Figure 1:
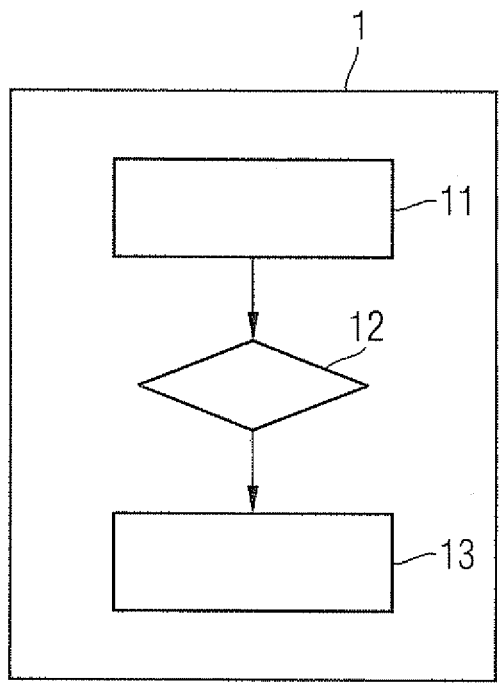
FIG. 1 shows systematic assessing of artifacts according to an embodiment of the present invention.

FIG. 1 shows systematic assessing 1 of artifacts according to an embodiment of the present invention.

The systematic assessing 1 of artifacts comprises at first assessing 11 of top-down artifacts. During the assessing 11 of top-down artifacts for each artifact is also determined, whether this artifact comprises components which are used when constructing the corresponding artifact. If 12 a top-down artifact comprises components used for its construction, assessing 13 of the components used for construction of the top-down artifact is performed. These components are bottom-up artifacts, thus, the assessing 13 of the components is the assessing 13 of bottom-up artifacts.

In following, assessment 11 of top-down artifacts and assessment 13 of bottom-up artifacts will be explained in more detail.

Figure 2:
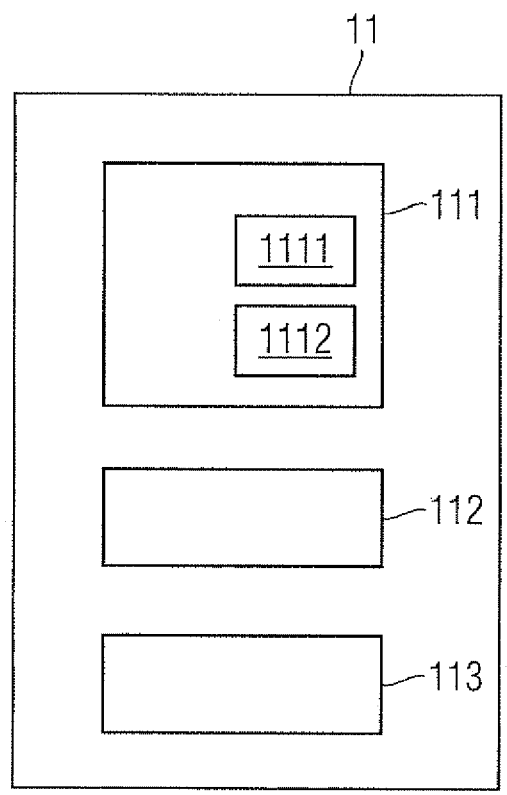
FIG. 2 shows assessing of top-down artifacts according to an embodiment of the present invention.

FIG. 2 shows assessing 11 of top-down artifacts according to an embodiment of the present invention.

For the assessment 11 of top-down artifacts, a model of assessment of top-down artifacts defining the ways of assessment 11 of top-down artifact with regard to reuse can be provided. The model of assessment of top-down artifacts defines how each top-down artifact is assessed. Within this context, the term assessment of a top-down artifact comprises classification 111 of the top-down artifact according to dimensions of classification, determination 112 of a degree of coverage for the top-down artifact, and estimation 113 of persistence of reuse of the top-down artifact.

The assessment 11 of top-down artifacts is performed in the context of the assessment model in the usual way (e.g., by use of NPLF-schema) to evaluate the As-Is state. In particular, it is then evaluated whether a result (related to artifacts) is not, partially, largely, or fully (referred to as NPLF) provided. Aspects to be taken into account for the assessment 11 have to keep the assessment 11 in a systematic and verifiable manner.

For a more efficient performance, only the key top-down artifacts may be assessed 11. However, this is optional and of course also an assessment 11 of all or a predetermined set of top-down artifacts can be performed.

For every key top-down artefact, artefacts reused during the creation of the respective top-down artefact are assessed.

If an order independent engineering (OIE) which is designing artifacts for reuse is available, it is possible to assess 11 artifacts provided by use of OIE applied to develop the system, product, or solution. For artifacts of this phase, the artifact provided for reuse should be assessed as such, i.e., by a proposed assignment to a category, by a determined degree of coverage of the artifact, and by an estimated persistence of reuse of the artifact, so that EOR provides templates of reuse for several phases.

The classification 111 of the top-down artifact within the assessment 11 of top-down artifacts may be performed in a two dimensional way. Within classification according to a first dimension 1111 the kind of preparation of top-down artifacts for reuse is assessed. The scale assigned to the first dimension is an ascending scale, wherein a larger value for a top-down artifact indicates that this top-down artifact is better prepared for reuse (e.g. more information and a better documentation of how to be reused in an industrial system, product or solution). Thus the first dimension of classification and the scale of this first dimension indicate a classification or assessment of top-down artifacts with regard to the character of preparation of artifacts to reuse the respective top-down artifacts.

Within classification according to a second dimension 1112 of classification information of top-down artifacts concerning the engineering or development of the respective top-down artifacts is assessed or classified. The scale assigned to the second dimension is also an ascending scale, wherein a larger value for a top-down artifact indicates that this top-down artifact has more structural information on the product or solution that should be reused by the use of the respective top-down artifact within the engineering.

Within the assessment of top-down artifacts with regard to the first dimension 1111 of classification for a top-down artifact it is determined, which extent of abstraction of the top-down artifact from concrete development project is provided. Thus, form or a kind of template of a top-down artifact is determined within the assessment of top-down artifacts with regard to the first dimension 1111. The determination of the extent of the abstraction of the top-down artifact is performed by analysis of available information the top-down artifact of how to reuse the respective top-down artifact in an industrial system, product or solution. The following classes of top-down artifacts may be provided with regard to the first dimension:

Class "Artifact" represents or indicates rather unspecified top-down artifacts, for which nearly no information of how to reuse these top-down artifacts is provided.

Class "Reference artifact" represents or indicates top-down artifacts indicated for reuse in an industrial system, product or solution. These top-down artifacts are indicated for reuse but the reuse of these top-down artifacts is not specified, thus, these artifacts are not prepared for the reuse. Typically, such a top-down artifact may be an artifact having a good construction and being successfully developed or applied in a previous project.

Class "Artifact for reuse" represents or indicates top-down artifacts, for which all parts being project or customer specific for a concrete system, product or solution are removed or marked as solution dependent parts of the top-down artifact. Typically, such top-down artifacts can be seen as a kind of library components.

Class "Artifact for reuse with a model of variability" represents or indicates top-down artifacts prepared for reuse such that for predetermined or all aspects of reuse it is defined, which parts of a top-down artifact are variable and, thus, to be adapted or implemented individually in a given engineering or development project. It is possible to provide the variable parts with possible variants of these parts and/or with information for implementation and/or for integration in concrete or individual systems, products, or solutions.

Within the assessment of top-down artifacts with regard to the second dimension 1112 of classification for a top-down artifact it is determined, in which extent the top-down artifact has or is provided with information about its structure or construction. By this structural or constructional information it can be indicated, which parts of the top-down artifact have potential for a reuse. Here, several parts of the top-down artifact can be provided with the corresponding information starting with simple hierarchical structures till semantic information.

The following classes of top-down artifacts may be provided with regard to the classification according to the second dimension 1112:

Class "Hierarchical structure" represents or indicates top-down artifacts, for which at least some of their parts are identified or determined and arranged into a hierarchical structure Class "Linkings and interactions" represents or indicates top-down artifacts, for which for at least some of (structural or constructional) parts of which relations, linkings and/or interactions with other (structural or constructional) parts of the top-down artifacts are defined.

Class "Implementation" represents or indicates top-down artifacts fitting also into the class "Linkings and interactions", for which has been specified additionally, how these parts and/or their relations, linkings and/or interactions are implemented.

At least classes "Linkings and interactions" and "Implementation" may comprise sub classes and, thus, be structured in more detail, if necessary.

Generally, the possibility for further sub classification can be provided for each of classes of both the first and the second dimension of classification.

Additionally, it has to be pointed out, that several ways of classification may be provided and that the classes provided above for both the first and the second dimension of classification represent just one example of many classification possibilities.

When assessing an artifact, within the classification 111 of the top-down artifacts it must be determined, which reusable top-down artifacts have been used, when constructing the product or solution. The character of the template is not decisive but the character of things actually used, Only things actually used should be considered during assessment.

For example, with regard to the kind of its template a reusable artifact could be classified as "Artifact for reuse" with regard to the first dimension and as "Linkings and interactions" with regard to the second dimension of classification. However, if the hierarchical construction only of the reusable artifact was used, with regard to the kind of its template the reusable artifact would be classified as "Artifact for reuse" with regard to the first dimension and as "Hierarchical construction" with regard to the second dimension of classification.

When assessing artifacts, the following boundary conditions should be taken into account with regard to classification The assessment is performed by use of the NPLF-schema in each dimension of the classification, i.e., for each dimension a NPLF-value is determined correspondingly.

The assignment to a class (independently from the dimension of the classification) and with it the determination of a category should be performed such that requirements of the respective classes of both dimensions are met largely. "Largely" means that the accordance with requirements of the respective classes can also be less than 100 percent. Here, a large accordance is requested.

Further, when assessing artifacts, the degree of coverage of artifact is determined 112. Within this aspect of assessment 11 it is evaluated, how relevant is the reuse for the creation of the artifact. Measure for this relevance is an estimated saving when the artifact is reused. Here, following categories may be classified for the coverage of a top-down artifact:

"very small": the degree of coverage of the top-down artifact will be determined as very small if the estimated saving is less than 20 percent.

"small": the degree of coverage of the top-down artifact will be determined as small if the estimated saving is equal or greater than 20 percent and less than 50 percent.

"large": the degree of coverage of the top-down artifact will be determined as large if the estimated saving is equal or greater than 50 percent and less than 80 percent.

"very large": the degree of coverage of the top-down artifact will be determined as very large if the estimated saving is equal or greater than 80 percent.

This schema of assessment of the degree of coverage is 1:1 compatible with the generic NPLF-scheme of the assessment model for assessment of the As-Is situation. Here, just more appropriate labels have been chosen.

The performance of determining 112 of the degree of coverage is useful in all phases, in which top-down artifacts have been used when constructing the artifact to be assessed. Determination of the degree of coverage within the order independent engineering for reuse (OIE) could be understood such that the expected profit is estimated in sense of an anticipated saving.

Further, estimation 113 of persistence of reuse of a top down artifact is performed within the assessment 11 of a top-down artifact.

One factor, which can be very useful when developing systems, products, or solutions in industrial engineering, is the estimation of persistence during the development of a system, product, or solution (e.g. a structure manifested in the customer requirements should be identifiable also in the system requirements and in the architecture of the solution). If this structure is not used, the persistence suffers. Typically, the effort of construction the product or solution of the corresponding artifact increases as the results of previous phases have to be interpreted anew or even, under certain circumstances, processed anew. If architecture of a detailed or partial solution is not used, it can be seen as a hint or indicator to problems concerning the integration of different engineering disciplines, as it is harder to integrate differently structured artifacts from different engineering disciplines (e.g., circuit diagrams, (mechanical) construction plans).

The following kinds of persistence within the estimation 113 of persistence of a top-down artifact can be distinguished:

"No structural persistence": Structural information is not reused, instead a new structure is used, which has no or only minor correspondence with the predetermined structure "Partial structural persistence": In this case, the predetermined structures are reused on the same level, however not consistently for the complete solution but instead only for parts of it "Structural persistence": The predetermined structure is consistently enhanced and refined. Examples for "structural persistence" are system families.

Figure 3:
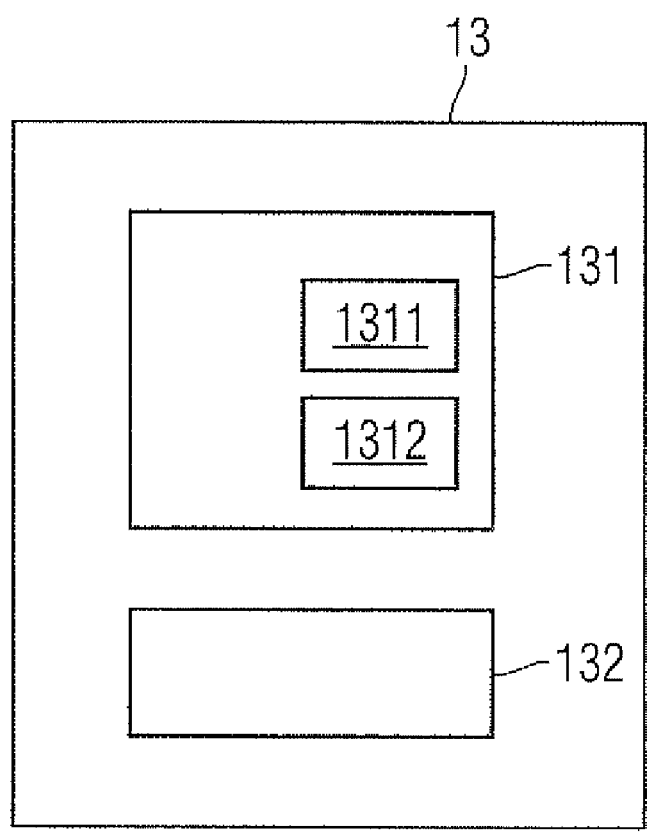
FIG. 3 shows assessing of bottom-up artifacts according to an embodiment of the present invention.

FIG. 3 shows assessing 13 of bottom-up artifacts according to an embodiment of the present invention.

From a model view, a bottom-up artifact typically represents a general component. A component is therefore defined as a part of a whole. Components can be used to construct a system. Thus, in following, within the assessment 13 of bottom-up artifacts, the term component will be used for a bottom-up artifact and vice versa.

For the purpose of reuse, a component has to be available as an entity that can be addressed independently from other components in the system, and that can be identified as such entity. Dependencies on other components or environment exist and are described with the component. In case of an artifact containing further components beside top-down structures, these components have to be classified.

Assessment 13 of bottom-up artifacts or components, respectively, comprises following:

Assigning 131 to dimensions of classification of bottom-up artifacts or components, respectively, or classifying 131 bottom-up artifacts or components, respectively, wherein said assigning or classifying 131 comprises assigning 1311 to the degree of availability (first dimension of classification of bottom-up artifacts) and assigning 1312 to the degree of parameterizability (second dimension of classification of bottom-up artifacts).

Determining 132 of a degree of coverage of a bottom-up artifacts or components, respectively.

Starting point for the assessment 13 of bottom-up artifacts is an artifact considered in a phase being in sense of top-down classification. For each (top-down) artifact it is determined, which components are established additionally when constructing the artifact. Here, the established components (bottom-up artifacts) are assessed according to the assessment 13 of bottom-up artifacts. In organisations, which have an order independent engineering for reuse (OIE), also such components can be assessed, which are provided by OIS for reuse. These components have to be assessed as such, i.e., the intended assignment to classes is performed and the anticipated degree of coverage of components is determined.

When assessing 13 bottom-up artifacts or components, classification 131 of bottom-up artifacts is performed.

The classification scheme for bottom-up artifacts has two dimensions, wherein the two dimensions comprise the following aspects of bottom-up artifacts:

A first dimension 1311 represents a degree of availability of a component or bottom-up artifact for the organisation or rather for process of development or engineering. The scale of this dimension is ascending in such sense that a component can be used in several projects or solutions, as it is known in a broader surround. Thus, the first dimension of for classification of bottom-up artifacts classifies 1311 a bottom-up artifact according to a degree of availability of the bottom-up artifact.

A second dimension 1312 represents a degree of parameterizability of a component or bottom-up artifact. The scale of this dimension is ascending, i.e. ranging from very limited to very comprehensive adaptability of a component. This dimension therefore represents the flexibility of a component. Thus, the second dimension for classification of bottom-up artifacts classifies 1312 a bottom-up artifact according to a degree of parameterizability of the bottom-up artifact.

When classifying 1311 according to the first dimension (degree of availability), this first dimension of classification represents classification of a component or bottom-up artifact according to the group of persons with access to the component or bottom-up artifact. Here, the following classes are distinguished:

Class "Individual component": The component or bottom-up artifact is available only to its developer who can use it in any solution.

Class "Informal component": An informal component or bottom-up artifact is used in an informal way within an organisational entity without assessing such component with respect to formal quality criterions or without such component being maintained in a central, designated repository.

Class "Domain component": A domain component is a component or bottom-up artifact being maintained in a central, designated repository, the component complying with minimum quality requirements with respect to reuse, in particular with respect to the amount of the documentation of a component. Typically, domain components are assigned to a faculty an organisational entity, although this is not mandatory.

Class "Domain overlapping components": A domain overlapping component is a general component or bottom-up artifact in such sense, that is can be used in more than one domain.

The second dimension of classification 1312 of bottom-up artifacts is based on the degree of parameterizability of a component or bottom-up artifact, i.e. this dimension represents the flexibility of the component or bottom-up artifact. The scale or classes of this dimension is/are as follows:

Class "Fix component": A component (or bottom-up artifact) that cannot be adapted, but instead has to be used as it is.

Class "Parameterizable component": A component (or bottom-up artifact) that can be adapted by a set of parameters with respect to its potential usage. In case of the component being a software component, the component can further be adapted by programming.

Class "Configurable component": A configurable component (or bottom-up artifact) defines a principal architecture of its construction of sub components. By choosing appropriate sub components, a configurable component can be adapted with respect to its overall potential usage.

Within classification 131 of bottom-up artifacts or components, respectively, for each assessed top-down artifact, components (or bottom-up artifacts) established for this top-down artifact (the bottom-up artifacts) are assessed. Within this scope, a category defines a clear assignment to a class of each of both dimensions of classification of bottom-up artifacts.

When classifying 131 the bottom-op artifacts or components, respectively, the following boundary conditions should be taken into account:

The assessment is performed by use of the NPLF-schema in each dimension of the classification, i.e., for each dimension a NPLF-value is determined correspondingly.

Within a category, only one assignment is possible. If more than one component or bottom-up artifact, respectively, is assigned to a category, visualisation of this assignment to the category will be performed in form of one assignment. The assessment of the degree of coverage returns one value for the assigned components or bottom-up artifacts, respectively.

Arrangement within one category does not have a semantic meaning.

The assignment to a class (independently from the dimension of the classification) and with it the determination of a category should be performed such that requirements of the respective classes of both dimensions are met largely. "Largely" means that the accordance with requirements of the respective classes can also be less than 100 percent. Here, a large accordance is requested.

Further, when assessing 13 bottom-up artifacts or components, degree of coverage of a bottom-up artifact or component is determined 132.

When determining 132 the degree of coverage, the assessment 13 of bottom-up artifacts is performed analogous to the assessment of artifacts with top-down reuse. Therefore, the measure is the estimated saving when artifacts are reused. Here, following categories may be classified for the coverage of a bottom-up artifact:

"very small", the degree of coverage of the bottom-up artifact will be determined as very small if the estimated saving is less than 20 percent.

"small", the degree of coverage of the bottom-up artifact will be determined as small if the estimated saving is equal or greater than 20 percent and less than 50 percent.

"large", the degree of coverage of the bottom-up artifact will be determined as large if the estimated saving is equal or greater than 50 percent and less than 80 percent.

"very large", the degree of coverage of the bottom-up artifact will be determined as very large if the estimated saving is equal or greater than 80 percent.

Here, it has to be taken into account that for each category the degree of coverage is estimated for all components or bottom-up artifacts, respectively, comprised in the corresponding category.

Detecting of the degree of coverage within order independent engineering for reuse (OIE) could be such that expected profit is estimated in sense of an anticipated saving.

When systematic assessing 1 of artifacts is finished, results derived during the systematic assessing 1 can be visualized. Here, the visualisation of results of systematic assessing 1 of artifacts is performed according to the kind of artifact (top-down or bottom-up) and comprises visualisation of results of assessment of top-down artifacts and, if available, also visualisation of results of assessment of bottom-up artifacts.

Figure 4A:
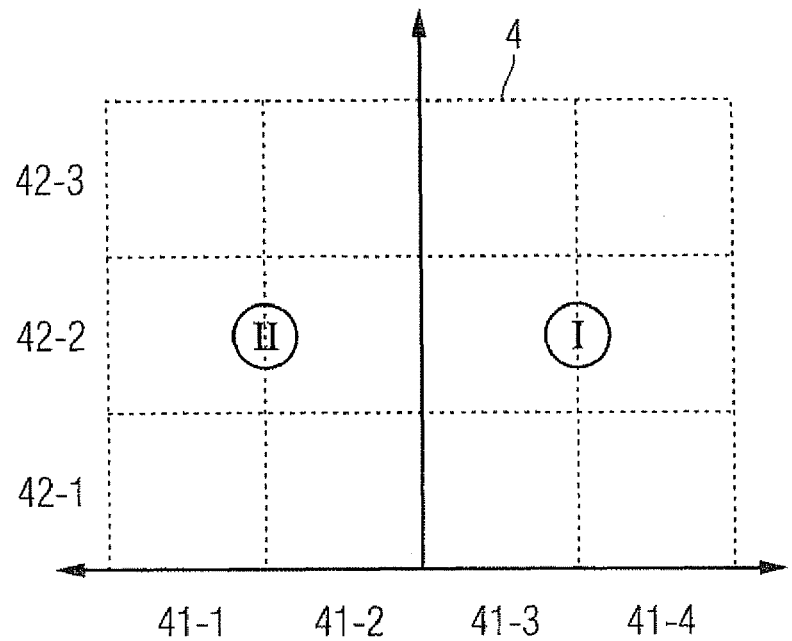
FIG. 4a shows a way of visualization of results of classification of top-down artifacts according to an embodiment of the present invention.

FIG. 4a shows a way of visualization of results of classification of top-down artifacts according to an embodiment of the present invention.

In particular, FIG. 4a shows the visualisation of the classification scheme for top-down artifacts in form of a top-down reuse matrix 4 (TD-matrix). Here, the single templates or forms of top-down artifacts are not represented as points but as areas with regard to horizontal and vertical axes, wherein the horizontal axis represents the classification of top-down artifacts according to the first dimension by the ascending scale with classes "Artifact" 41-1, "Reference artifact" 41-2, "Artifact for reuse" 41-3, and "Artifact for reuse with a model of variability" 41-4, and wherein the vertical axis represents the classification of top-down artifacts according to the second dimension by the ascending scale with classes "Hierarchical construction" 42-1, "Linkings and interactions" 42-2, and "Implementation" 42-3. The representation by use of areas instead of points should express that in practice not one certain reference top-down artifact is provided but that variations around a reference top-down artifact are given.

The area I of FIG. 4a defines systematic forms or templates of the top-down reuse, wherein assignments in area II of FIG. 4a should be interpreted as an ad-hoc reuse. The area II is not the core area of the assessment. However, it is considered, to represent accurately the reality of reuse. From point of view of the reuse, the representation within the area I defines an order with regard to the quality of the reused top-down artifacts. A reused artifact placed within a crossing point of classes "Artifact for reuse" 41-3 and "Hierarchical construction" 42-1 has the worst classification with regard to quality of reuse. However, a classification within a crossing point of classes "Artifact for reuse with a model of variability" 41-4 and "Implementation" 42-3 represents the best assessment with regard to quality of reuse. However, it should not be concluded that for each organisation it is reasonable to have artifacts in area of classes "Artifact for reuse with a model of variability" 41-4 and "Implementation" 42-3. Rather, a set of boundary conditions (e.g., consideration of costs, dynamics of customer markets) decide on the further positioning and development of an organisation with regard to the top-down reuse.

Figure 4B:
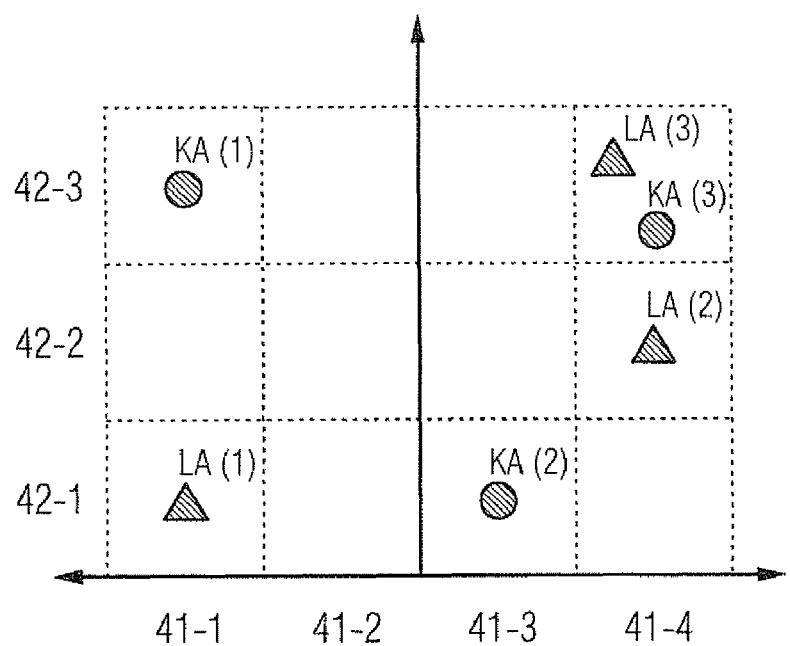
FIG. 4b shows a visualization of results of classification of top-down artifacts according to an embodiment of the present invention.

FIG. 4b shows a visualization of results of classification of top-down artifacts according to an embodiment of the present invention.

In particular, FIG. 4b shows in a schematic way, how an arrangement of artifacts "customer requirements" KA and "architecture of solution" LA could look like within the scheme of top-down classification explained above. Customer requirements are generated in the phase of requirement elicitation. The architecture of solution, in turn, is generated during the phase of engineering. In FIG. 4b, possible variants of classification of customer requirements are represented as circles, and possible variants of classification of architectures of solutions are represented as triangles. Here, the examples presented should not be seen as exhaustive, of course, in concrete organizations also further arrangements are possible. In following, the arrangements presented exemplary in FIG. 4b will be explained in more detail:

KA(1): In this case, a customer requirement document arises or is generated for a solution by copying of an arbitrary customer requirement (e.g., a customer requirement of a project already completed) and by adapting of the copied document with regard to the requirements, conditions, and/or facts of the current solution. Here, a simple "Copy-and-Modify"-approach is used, which does not require efforts of reprocessing of the used template (the already available customer requirement of another project) for the reuse of the template. Here, a typical kind of ad-hoc reuse is given.

KA(2): In this case, a customer requirement document arises or is generated based on a defined template, wherein the template only defines the hierarchical construction or structure of a general document for customer requirements.

KA(3): In this case, information concerning variability of the template has been added to "Artifact for reuse". The template comprises information of already existing variants used in different concrete fields or areas. In this case, beside defined or determined linkings and interactions, the template comprises also concrete requirements defined in an invariant way, wherein each requirement is defined for a concrete variant already modelled. Within the area of domain engineering such modelling is referred to as feature model.

LA(1): In this case, architecture of a solution is copied from a arbitrary project, wherein the architecture is not reused completely but only the hierarchical construction or structure of the attachment is reused, i.e., the hierarchical construction or structure of the underlying architecture of a solution. Here, a typical kind of ad-hoc reuse is given.

LA(2): In this case, a standardized architecture of solution exists. This architecture is not worked out in details but it is defined clearly, how the hierarchical construction or structure is designed and which interactions between the elements or components of the standardized architecture exist.

LA(3)+LA(3) represents an example for use of reference architecture when constructing or developing a concrete architecture for a solution. As regards content, this situation means, that by the reference architecture several variants of the architecture for the architecture of the solution are predefined or predetermined, and that for a concrete solution no additional variants have to be determined as at least one of the predefined or predetermined variants can be used.

Figure 4C:
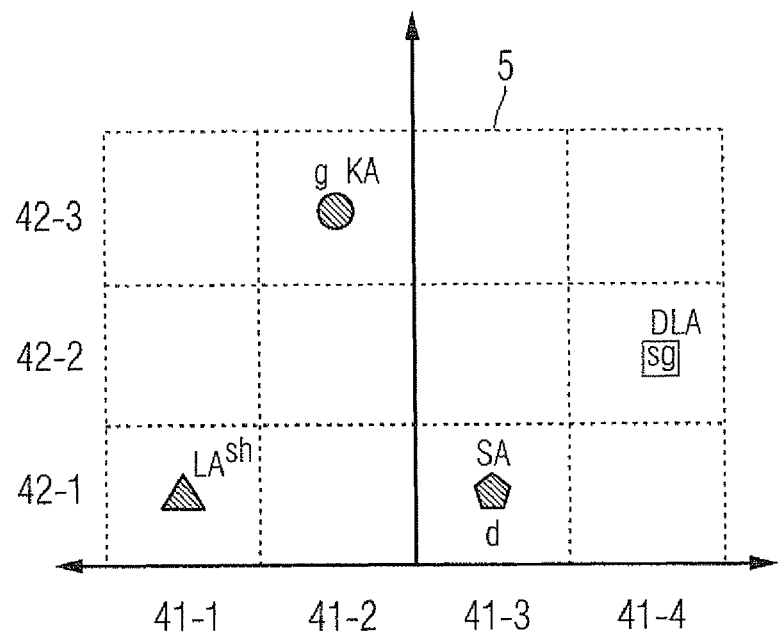
FIG. 4c shows a visualization of results of determination of degrees of coverage of top-down artifacts according to an embodiment of the present invention.

FIG. 4c shows a visualization of results of determination of degrees of coverage of top-down artifacts according to an embodiment of the present invention.

Representation of degree of coverage is provided by annotation of the corresponding top-down artifact. If no annotation is provided, no assessment is performed. In FIG. 4c, the following abbreviations or labels with following meanings determined are used as annotations for different degrees of coverage:

Sg stands for a very small degree of coverage;
G stands for a small degree of coverage;
D stands for an average degree of coverage;
H stands for a large degree of coverage; and
Sh stands for a very large degree of coverage.

Here, the abbreviations or labels provided above and used in FIG. 4v are examples and should not be seen as exhaustive. Here, of course, also other abbreviations or labels can be introduced when implementing the present invention.

In FIG. 4c, it is shown, how the degree of coverage can be visualised. Here, besides the corresponding to top-down artifacts, classified according the two dimensions of classification of top-down artifacts and visualised according to the classifications assigned to the top-down artifacts, also the abbreviations or labels of corresponding degrees of coverage are visualised.

Figure 4D:
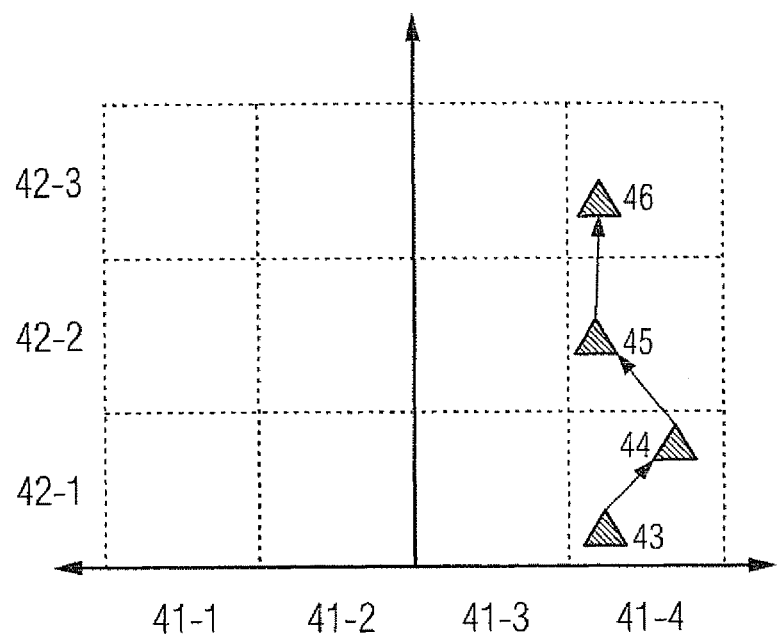
FIG. 4d shows a visualization of results of estimation of persistence of reuse of top-down artifacts according to an embodiment of the present invention.

FIG. 4d shows a visualization of results of estimation of persistence of reuse of top-down artifacts according to an embodiment of the present invention.

In FIG. 4d, the persistence of between the top-down artifacts is visualised in such way that different arrows between artifacts being dependent from each other and, thus, indirectly also between the different phases are drawn. The different categories of persistence explained above can be shown by different arrows. For example, different kinds of arrows and different colours for the arrows can be used to provide the possibility to distinguish visually between the different categories of persistence. In following, an example for one possible representation of arrows for the categories of persistence is provided:

⇒no structural persistence;
⇢partial structural persistence; and
→ structural persistence.

FIG. 4d shows top-down artifacts like customer requirements 43, system requirements 44, architecture of solution 45, and architecture of a detailed solution 46. The example of FIG. 4d represents a solution, which has a product line approach and, thus, a structural persistence is given. Therefore, the arrows representing dependencies (links or interactions, for example) between the artifacts 43, 44, 45, 46 are arrows representing structural persistence.

Figure 5A:
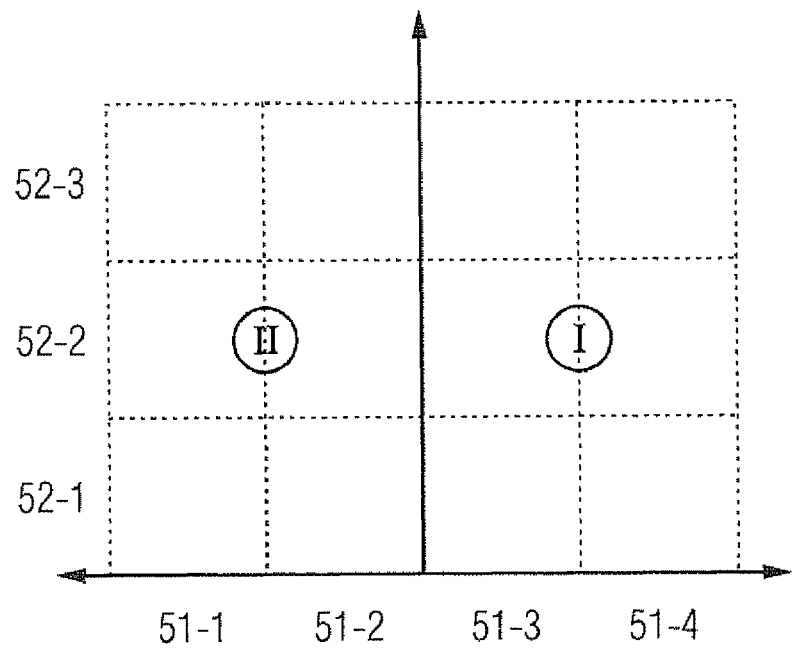
FIG. 5a shows a way of visualization of results of classification of bottom-up artifacts according to an embodiment of the present invention.

FIG. 5a shows a way of visualization of results of classification of bottom-up artifacts according to an embodiment of the present invention.

In particular, FIG. 5a shows the visualisation of the classification scheme for bottom-up artifacts in form of a component reuse matrix 5 (KM-matrix). Here, the degree of availability (standing for the first dimension of the classification of bottom-up artifacts) and the degree of parameterizability (standing for the second dimension of the classification of bottom-up artifacts) are not represented as points but as areas with regard to horizontal and vertical axes, wherein the horizontal axis represents the classification of bottom-up artifacts according to the first dimension (degree of availability) by the ascending scale with classes "Individual component" 51-1, "Informal component" 51-2, "Domain component" 51-3, and "Domain overlapping components" 51-4, and wherein the vertical axis represents the classification of top-down artifacts according to the second dimension (degree of parameterizability) by the ascending scale with classes "Fix component" 52-1, "Parameterizable component" 52-2, and "Configurable component" 52-3. The representation by use of areas instead of points should express that in practice no certain reference bottom-up artifact is provided but that variations around a reference top-down artifact are given.

The area I of FIG. 5a defines a systematic form of the bottom-up reuse, wherein assignments in area II of FIG. 5a should be interpreted as an ad-hoc reuse. The area II is not the core area of the assessment. However, it is considered, to represent accurately the reality of reuse.

From point of view of the reuse, the representation of both areas I and II defines an order with regard to the quality of the components or bottom-up artifacts, respectively. A component or bottom-up artifact, respectively, placed within a crossing point of classes "Individual component" 51-1 and "Fix component" 52-1 has the worst classification with regard to quality of reuse. However, a classification within a crossing point of classes "Domain overlapping components" 51-4 and "Configurable component" 52-3 represents the best assessment with regard to quality of reuse. However, it should not be concluded that for each organisation it is reasonable to have artifacts in area of classes "Domain overlapping components" 51-4 and "Configurable component" 52-3. Rather, a set of boundary conditions (e.g., consideration of costs, dynamics of customer markets) decide on the further positioning and development of an organisation with regard to the bottom-up reuse.

Figure 5B:
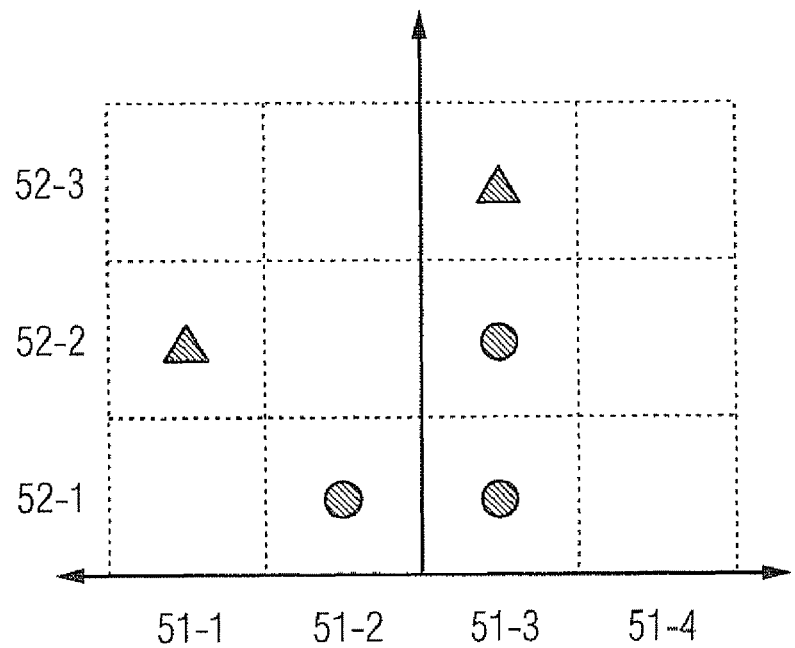
FIG. 5b shows a visualization of results of classification of bottom-up artifacts according to an embodiment of the present invention.

FIG. 5b shows a visualization of results of classification of bottom-up artifacts according to an embodiment of the present invention.

In particular, FIG. 5b shows a possible arrangement of components or bottom-up artifacts according to the classification of bottom-up artifacts. The general idea of visualisation has already been explained above with regard to FIG. 5a.

Figure 6:
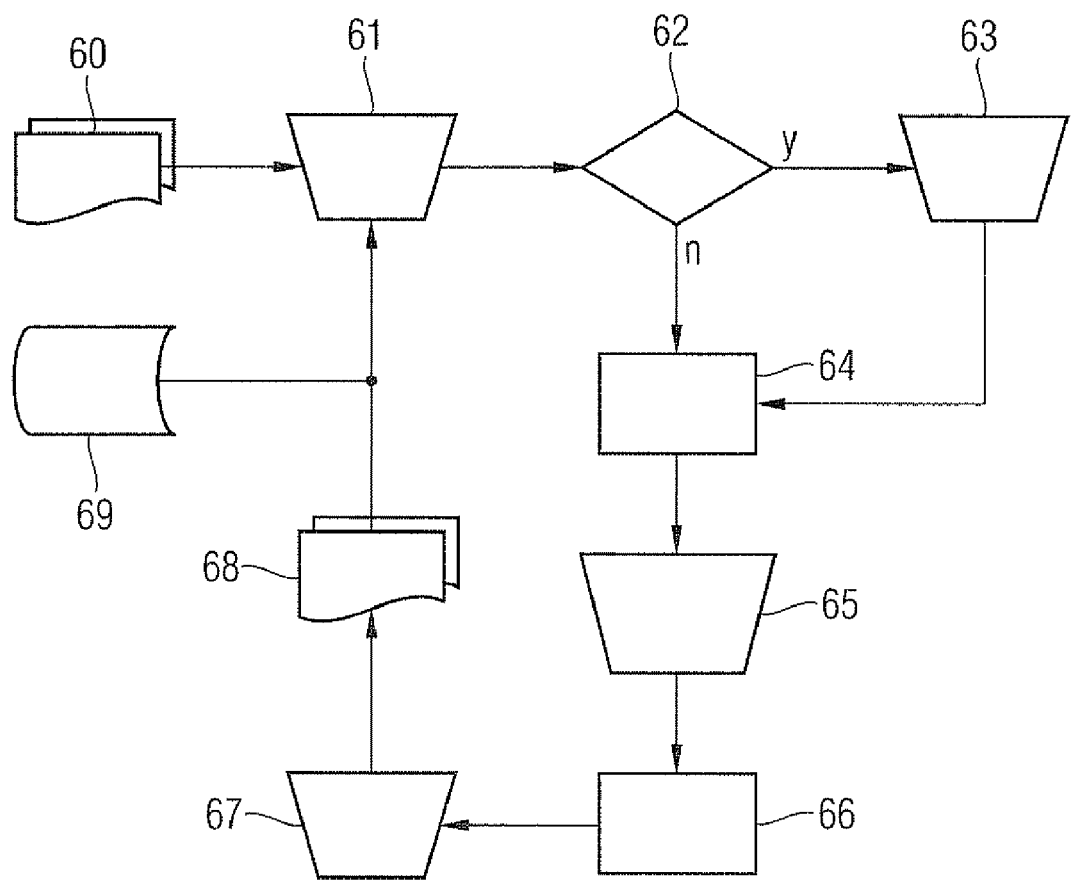
FIG. 6 shows a flow diagram representing an embodiment of appliance of assessment and visualization of artifacts according to the present invention.

FIG. 6 shows a flow diagram representing an embodiment of appliance of assessment and visualization of artifacts according to the present invention.

As mentioned, the steps provided in FIG. 6 are steps of one possible embodiment of appliance of the assessment and visualization of artifacts according to the present invention. However, several further integrations of the assessment and visualization according to the present invention described in general above are possible within different environments of engineering.

According to the embodiment of FIG. 6, a set of artifacts 60 is provided and assessed by the following steps or processes of FIG. 6. In step or process 61, assessment of top-down artifacts is performed as described above. Here, also data edited by experts can be integrated, wherein the experts may provide their knowledge by inputting additional information or assessment values to the top-down artifacts to be assessed. Assigning of the corresponding information to the top-down artifacts can be performed, for example, by providing appropriate forms or input masks. A computing entity can then connect the data of artifacts and the data provided by experts and provide the assessment of top-down artifacts as already described above as result of step or process 61.

In step or process 62 of FIG. 6, it is checked whether an artifact with top-down reuse (top-down artifact) comprises compounds or bottom-up artifacts, respectively. If so y, the compounds or bottom-up artifacts comprised in top-down artifacts also have to be assessed with regard to their reusability 63. Otherwise n, it is preceded with step or process 64.

In step or process 63, as mentioned, the compounds or bottom-up artifacts, respectively, are assessed. The assessment of compounds or bottom-up artifacts, respectively, is performed as described above. Also here, data edited by experts can be integrated, wherein the experts may provide their knowledge by inputting additional information or assessment values to the compounds or bottom-up artifacts, respectively, to be assessed. Assigning of the corresponding information to the compounds or bottom-up artifacts, respectively, can also here be performed by providing appropriate forms or input masks, for example. A computing entity can then connect the data of compounds or bottom-up artifacts, respectively, and the data provided by experts and provide the assessment of compounds or bottom-up artifacts, respectively, as already described above as result of step or process 63.

In step or process 64 of FIG. 6, the results of assessments of both top-down and bottom-up artifacts are automatically aggregated and visualized as described above in more detail.

In step or process 65 of FIG. 6, forms, input masks, or other tools are provided to experts to determine objects of artifacts and/or, if needed or if possible, to input further information or data to enable an improvement of reuse of the artifacts.

In step or process 66 of FIG. 6, an automatized determination of potential of reuse of the assessed artifacts is performed. Additionally, it can be determined, for which artifacts an improvement of the artifacts with regard to reuse (e.g., by providing additional information) would provide a maximal profit with regard to the objects set in the corresponding industrial engineering.

In step or process 67, the improvement of artifacts with regard to reuse is performed if needed or required. These improved artifacts 68 can then be assessed anew 61 by use of appropriate criteria 69 set for top-down and/or bottom-up artifacts.

Figure 7:
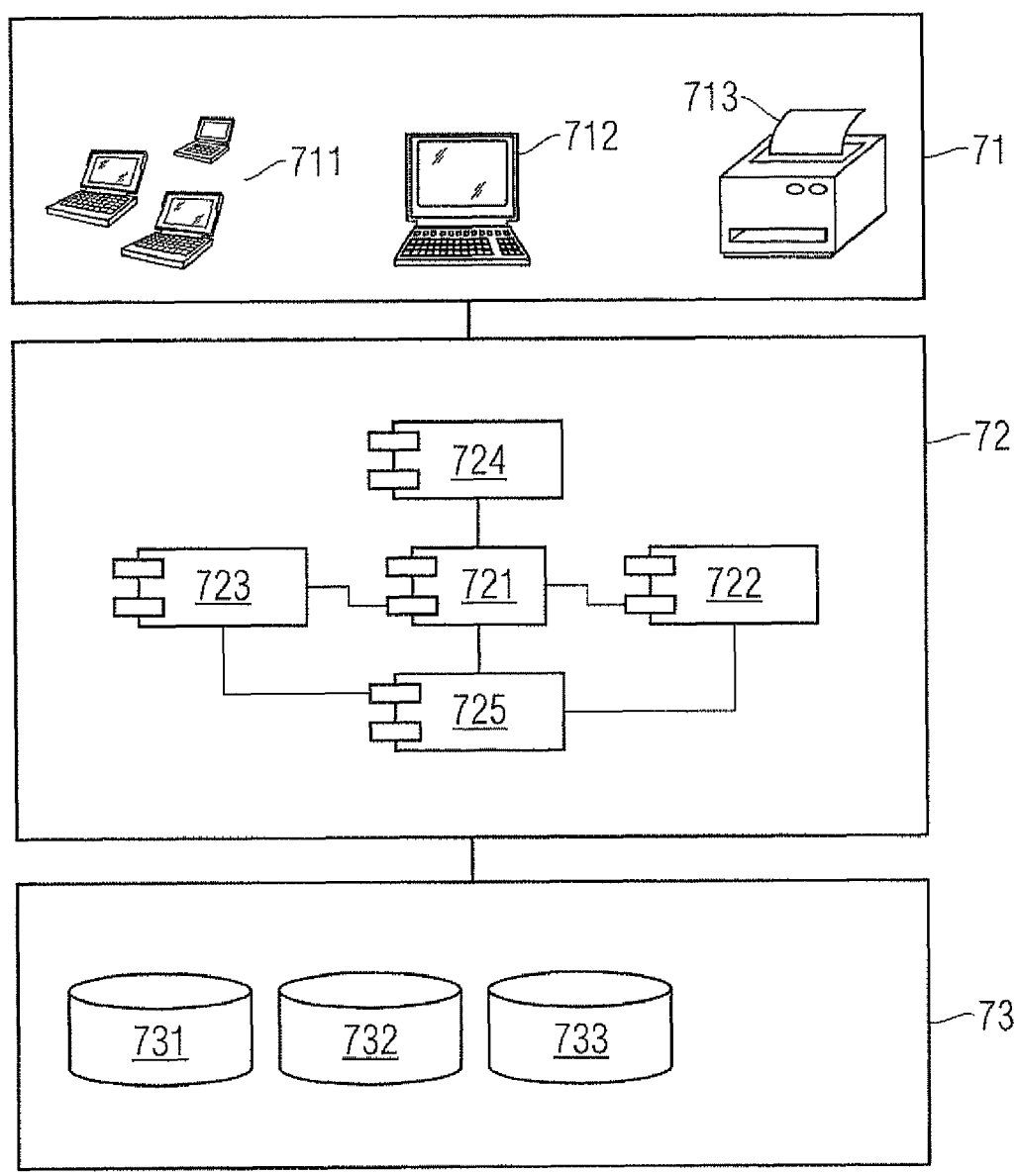
FIG. 7 shows a system according to an embodiment, which enables the assessment and visualization of artifacts according to the present invention.

FIG. 7 shows a system according to an embodiment, which enables the assessment and visualization of artifacts according to the present invention.

The system according to an embodiment enabling the implementation of the assessment and visualization of artifacts according to the present invention comprises the following three layers: a presentation layer 71; an application layer 72; and a data layer 73.

The presentation layer 71 is configured to represent input and output data of the system. As devices or entities enabling the input and output or data, for example, laptops 711, computers or workstations 712, printers 713, or other appropriate devices or entities can be used. For output of data, for example, web browsers, integrated environments of development, or processors for printing may be used allowing use of different formats of files or data.

The layer of application 72, comprises beside interfaces to the presentation layer 71 and to the data layer 73 like the data interface 725 a control unit 721, an assessor of artifacts 722, an entity or unit for determining potentials of reuse 723, an entity or unit for visualizing assessed artifacts and for providing reports with regard to the assessed artifacts 724.

The control unit or entity 721 is configured to process inputs provided by the presentation layer 71; to start processes like assessment of artifacts in the assessor of artifacts 722 and/or determination of potentials of reuse for artifacts in the entity or unit for determining potentials of reuse 723; to control the correct order of performance of processes; and to provide the results of processes like assessment of artifacts and/or determination of potentials of reuse for artifacts to the entity or unit for visualizing assessed artifacts and for providing reports with regard to the assessed artifacts 724.

The assessor of artifacts 722 is configured to determine assessments of artifacts according to the present invention (as described above) based on the data provided to the assessor of artifacts 722 by the control unit or entity 721 and/or by the data interface 725. Thus, the assessor of artifacts 722 is configured to perform the classification and categorization of the corresponding artifacts as described above and to save the assessment data, if required. Further, the assessor of artifacts is configured to derive data concerning artifacts, assessment results or data, and/or assessment criteria by use of the data interface 725 from the data layer 73.

The entity or unit for determining potentials of reuse 723 is configured to determine potential of reuse for a given artifact based on assessment data (results of assessment) and criteria for the analysis of the potential. Further, the entity or unit for determining potentials of reuse 723 is configured to save the results of the determination of potentials of reuse of artifacts. Additionally, the entity or unit for determining potentials of reuse 723 is configured to derive data required for the determination by use of the data interface 725 from the data layer 73.

The entity or unit for visualizing assessed artifacts and for providing reports with regard to the assessed artifacts 724 is configured to start the assessment of artifacts and the determination of potentials of reuse of artifacts. Further, the entity or unit 724 is configured to visualize or represent the results of the assessment of artifacts and the determination of potentials of reuse of artifacts and/or to print them by initiating a corresponding printer job. Thus, the entity or unit 724 is also configured to provide an interface between the layer of application 72 and the presentation layer 71. Further, the visualization provided by the entity or unit 724 provides to the user the possibility to input data or information for assessment of artifacts of for determination of potentials or reuse of artifacts.

The data layer 73 is configured to manage data. This data is also provided to perform the automatized assessment 66 of FIG. 6. The data managed by the data layer 73 comprises data concerning artifacts 731, assessment data 732, and/or criteria for assessment of artifacts 733. Assessment data 732 can comprise both results of assessment of artifacts and results of determination of potentials of reuse of artifacts. The criteria for assessment of artifacts 733 define limits of assessment of the classification of artifacts.

The present invention provides an automatized methodology for optimizing reuse of artifacts in industrial engineering, wherein by targeted dealing with deficits of reuse identification or determination of artifacts being particularly suitable for reuse becomes possible. The present invention enables a systematic and effective determination of potentials of top-down artifacts and bottom-up artifacts and within this scope also assessment of deficits of artifacts with regard to reuse. Based on the detected deficits, targeted improvement of artifacts can be performed.

Summarizing, the present invention refers to a method automatizing optimization of reuse of artifacts in industrial engineering, wherein the reuse of artifacts is optimized by assessing of artifacts based on classifying of artifacts. Further, the present invention relates to computing entities and system supporting the optimization of reuse of artifacts in industrial engineering. The present invention enables targeted dealing with deficits of reuse by which identification of artifacts being particularly suitable for reuse becomes possible.

It is noted that the present invention is not restricted to the above embodiments and that the embodiments may vary within the scope of the attached claims.

The invention claimed is:

1. A method for optimizing reuse of artifacts in industrial engineering, said method comprising
    systematic assessing of artifacts via a system having a control unit configured to process inputs, perform assessments of artifacts, and provide results of the assessments of artifacts, wherein the assessing of artifacts is based on classifying of artifacts comprising assessing of a top-down artifact and assessing of a bottom-up artifact,
    wherein assessing of a bottom-up artifact comprises classifying of said bottom-up artifact based on a classification scheme for bottom-up artifacts comprising two dimensions for classification of bottom-up artifacts, wherein a first dimension of said two dimensions for classification of bottom-up artifacts classifies said bottom-up artifact according to a degree of availability of said bottom-up artifact.

2. The method according to claim 1, said assessing of said top-down artifact comprising classifying of said top-down artifact based on a classification scheme for top-down artifacts.

3. The method according to claim 2, wherein said classification scheme for top-down artifacts comprises two dimensions for classification of top-down artifacts.

4. The method according to claim 3, wherein a first dimension of said two dimensions for classification of top-down artifacts classifies said top-down artifact based on information content of said top-down artifact.

5. The method according to claim 3, wherein a second dimension of said two dimensions for classification of top-down artifacts classifies said top-down artifact based on structural content of said top-down artifact.

6. The method according to claim 1, said assessing of said top-down artifact comprising determining of a degree of coverage of said top-down artifact.

7. The method according to claim 1, said assessing of said top-down artifact comprising estimation of a persistence of reuse of said top-down artifact.

8. The method according to claim 1, wherein said assessing of said bottom-up artifact is performed if said top-down artifact comprises said bottom-up artifact.

9. The method according to claim 1, wherein a second dimension of said two dimensions for classification of bottom-up artifacts classifies said bottom-up artifact according to a degree of parameterizability of said bottom-up artifact.

10. The method according to claim 1, said assessing of said bottom-up artifact comprising determining of a degree of coverage of said bottom-up artifact.

11. A system for supporting optimization of reuse of artifacts in industrial engineering, comprising
    a control unit configured to process inputs, perform assessments of artifacts, and provide results of the assessments of artifacts,
    said system being configured to perform a systematic assessing of artifacts based on classifying of artifacts comprising assessing of a top-down artifact and assessing of a bottom-up artifact,
    wherein assessing of a bottom-up artifact comprises classifying of said bottom-up artifact based on a classification scheme for bottom-up artifacts comprising two dimensions for classification of bottom-up artifacts, wherein a first dimension of said two dimensions for classification of bottom-up artifacts classifies said bottom-up artifact according to a degree of availability of said bottom-up artifact.

12. The system according to claim 11, wherein providing results of the assessments of artifacts comprises visualizing results of the systematic assessing of the artifacts.

* * * * *